Patented Feb. 2, 1932

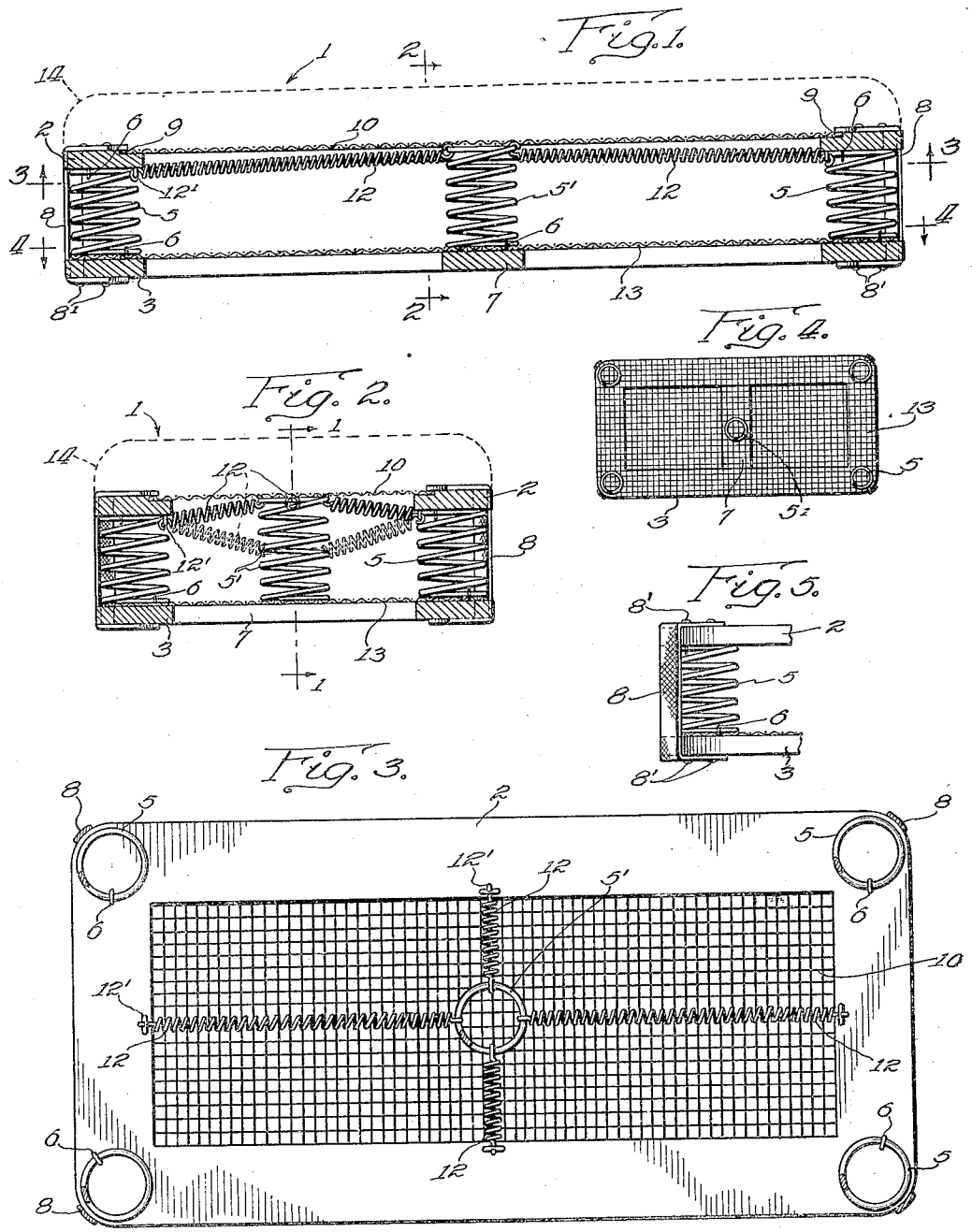

1,843,550

UNITED STATES PATENT OFFICE

HYMAN FREEDMAN, OF CHICAGO, ILLINOIS

SPRING SEAT

Application filed February 28, 1930. Serial No. 432,135.

This invention relates to spring seat structures of the type such as may be used in davenports and other household furniture and also in the seats of motor vehicles, and is especially adapted for use on motor trucks, wherein the spring structure is subject to unusual strain due to the hard riding quality of that particular kind of vehicle.

The main objects of this invention are to provide an improved form and arrangement of the essential parts of the seat structure in such a manner as to make a seat capable of assuring comfort to the user, especially when the seat is used in connection with a vehicle which is not equipped with the resiliency in its spring parts necessary to insure comfort in riding; to provide a better relative proportion and arrangement for the various spring elements; to provide a seat device which shall be simple in construction and highly efficient in service as compared with spring seats heretofore in use; and to provide a spring structure of the sort referred to the essential parts of which may be readily assembled without the need of skilled labor.

An illustrative embodiment of this invention is shown in the accompanying drawings, in which:

Figure 1 is a vertical section through the frame and spring structure, on the line 1—1 of Fig. 2, the upholstering being indicated only in dotted outline.

Fig. 2 is a section on the line 2—2 of Fig. 1.

Fig. 3 is a section on the line 3—3 of Fig. 1.

Fig. 4 is a small scale section on the line 4—4 of Fig. 1.

Fig. 5 is a detail in elevation of one corner of the spring structure, showing one of the corner springs and the means for holding the same in compression.

In the construction shown in the drawings, the seat 1 comprises a pair of horizontally disposed and slightly dissimilar open frames 2 and 3, arranged the one over the other as shown in Figs. 1, 2 and 5. They may be and preferably are identical in size and each comprises a framed oblong rectangular rim. The opposing faces of these rims are adapted to receive the ends of and serve as supports for the upright coiled corner springs 5. These springs serve as yielding spacers for the frames 2 and 3 and are fastened thereto by means of staples 6 or equivalent means.

The lower frame 3 is provided with a centrally transverse bar 7 disposed in the same plane with the peripheral members. Mounted centrally on the bar 7 is a helical spring 5' similar to but normally under less compression than the springs 5.

Flexible tension straps or snubbers 8 of webbing or the like are provided at the corners of the frames 2 and 3 and are permanently fastened thereto, as by screws 8'. The snubbers limit the separation of frames 2 and 3 and hold the springs 5 under compression. The springs 5 and 5' are thick or broad enough to impart great stability against excessive side sway.

The upper frame 2 is formed with a peripheral recess at its inner top edge as at 9, to receive the edges of a wire screen or netting 10 stretched across the top surface of the frame. This netting is preferably elastic and it provides a light flexible closure or filler for the opening in the frame 2. It helps to distribute the load and it also functions in a supplemental way to help hold said frame together securely.

The said spring 5' being positioned uprightly on the middle of the lower frame with its top bearing directly against the lower side of netting 10, serves to receive and carry the bulk of the load, or at least always a large part of it, especially when the load is positioned over the opening in frame 2.

Yielding means to compress the center spring 5' are provided, comprising radial tension springs 12 of long slender helical form, which are fastened at one end to the top of spring 5', and at the other end are secured to the under surface of the upper border frame 2, as at 12'. These springs 12 also serve in such a manner that should the load directly over or upon the upper frame become excessive the radial springs will themselves bear part of the load and transmit it to the middle spring 5'.

In the event the load on the middle part of the seat, upper frame 2 and wire netting 10 becomes excessive, the spring 5' will be so depressed that the radial springs will swing to a horizontal position of minimum tension. Any further compression of the spring 5' beyond this relative point will incline the springs 12 downward toward the center and tend to bring them into greater tension and so help the middle spring to sustain the load.

Top sideslipping or inclination of the central spring 5' is minimized by the differential pull of the radial springs 12 which tend to maintain the spring 5' in its upright central position.

Wire netting 13 is stretched across the top surface of the lower frame 3 to impart a neat and finished appearance and also prevents the lodging of foreign objects in the spring structure. It also serves to help hold the lower frame intact.

A seat pad 14 of any desirable form may be mounted on the upper frame 2 as shown in dotted outline on Figs. 1 and 2.

In operation when the seat receives a distributed normal load under easy riding conditions, the corner springs 5 and the central spring 5' are brought about equally into action, the netting 10 aiding in the equalization. However, whenever the load becomes excessive at or near the center, the spring 5' becomes depressed, so that the radial springs 12 will then function by upward pull to assist said spring 5'. Should the road be unusually rough, so that the load is shifted from one position to another on the seat, the radial springs will then act to take up any excessive weight at any point. For instance, should the weight be brought to bear upon one of the corners of the seat so that the rest of the seat is not under as much load or any load, the radial springs adjacent that corner together with the upright spring directly under the load will be brought into cooperative action.

A seat made in accordance with this invention is capable of being made extremely light and portable, having all of the advantages of a seat that is cushioned with a greater number of springs or a numerous assemblage of vertically acting helical springs. Furthermore, the constituent parts of the present spring construction may be readily made and assembled by unskilled labor.

It is to be noted that a special advantage of the very light and portable seat construction herein described is that it may be readily removed from an automobile or truck and slid under the chassis for one to lie upon in making underneath repairs. Casters, not shown, may be easily fitted to the corners of the lower frame 7.

Although but one specific embodiment of this invention has been herein shown and described, it will be understood that numerous details of the construction shown may be altered or omitted without departing from the spirit of this invention as defined by the following claims.

I claim:

1. A framed spring structure comprising a pair of mainly similar rectangular open peripheral frames disposed horizontally in spaced relation, one above the other, in combination with helical springs disposed at each of the corners respectively to hold said frames yieldingly apart, flexible tension means to limit the separation of said frames and to ever hold said springs in substantial compression, a helical spring disposed uprightly in the middle part of said structure and being less compressed than said corner springs, said lower frame having a crossbar whereon the aforesaid medial spring rests and relatively long and slender helical springs connecting the upper end of the said medial spring radially to the said upper frame to help distribute the load wherever placed on any part of the structure.

2. In a spring structure upper and lower frames, helical springs interposed between said frames, a centrally disposed spring mounted on said lower frame and extending between the two frames and being of sufficient length to assist said helical springs to support said upper frame, a plurality of radial springs connected to the upper end of said centrally disposed spring and to the bottom of said upper frame arranged to exert an upward pull on said central spring when it is compressed, a woven mesh mounted on said upper frame, said upper frame being limited in its adjustable relation to the lower frame by the combined action of the centrally disposed and radial springs.

3. A device of the class described, comprising a rigid rectangular base, upright helical springs at the corners and center thereof respectively, an open peripheral frame resting directly upon the corner springs and long narrow helical springs distributed radially and connecting the lower part of the upper frame to the upper end of the middle spring.

Signed at Chicago this 26th day of February, 1930.

HYMAN FREEDMAN.